Patented Dec. 11, 1945

2,390,961

UNITED STATES PATENT OFFICE 2,390,961

POLYMERIZED RUBBERLIKE PRODUCT AND PROCESS OF MAKING THE SAME

Donald Sanderson, Bloomfield Hills, and Harry E. Pfaff, Detroit, Mich., and Murray E. Garrison, Compton, Calif.

No Drawing. Application July 13, 1943, Serial No. 494,580

18 Claims. (Cl. 260—738)

Our invention relates to a novel polymerized rubber-like substance and to a novel process for producing same. The product and its method of compounding will be particularly described with reference to its preferred utility as a hydrocarbon extender, e. g., a rubber extender, though without intent to limit the invention thereto as the product can be used in some instances without being combined with other materials and forms a valuable rubber-like product.

It is an important object of the present invention to provide a novel rubber-like product, and a novel method of making same, the product having uses in various arts.

We have found that a valuable polymerized product can be made, using as a base material a polymerized vegetable component comprising one or more vegetable oils, which can be compounded with certain additional materials to produce a polymerized product having some or all of the physical qualities of natural rubber in varying degree, depending upon the materials and the amount of polymerization. The term "polymerization" is used to described and designate either a thickening action or a thinning action in which is effected a rearrangement of the hydrocarbon molecules into chains to produce a higher-molecular-weight rubber-like product. This product is useful in itself or it can be mixed and vulcanized with natural or synthetic rubber, or it can be mixed with plastic materials prior to extrusion, molding, shaping, or setting thereof.

One of the most important immediate uses for the invention is an extender for natural rubber, reclaimed rubber, synthetic rubber, and kinds of plastic materials, such as styrene formulations, "Ethocel" or cellulose acetate formulations, "Saran" or vinylidene chloride formulations, polyvinyl chloride VYNW and copolymer VYNS of polyvinyl chloride and polyvinyl acetate formulations. The word "extender" is used to designate a novel product, whether used as an extender to extend available stocks of substances or whether used in the processing and manufacturing of synthetic rubber, plastics, and related materials resulting in new and useful products.

It is an object of the invention to produce a polymerized product acting as an extender for such substances as natural rubber, reclaimed rubber, synthetic rubber, and plastics without materially or unduly reducing their physical characteristics or properties. For example, it has been found possible, in some instances, to mix the product in proportions of one-half or less with reclaimed rubber and vulcanize the mixture by known steps to produce standard-size automobile tires giving a mileage very little less than, and in some instances greater than, similar tires produced from reclaimed rubber alone.

It is another object of the invention to produce a polymerized product suitable for mixing with plastic materials and, in particular, plastic material such as styrene, ethyl cellulose, vinylidene chloride, polyvinyl chloride VYNW and copolymer polyvinyl chloride and polyvinyl acetate VYNS to form new products having any or all new physical characteristics, such as increased flexibility, increased dielectric strength, increased toughness, and less brittleness.

It is also an object of the present invention to provide a rubber-like product made by a combination of a polymerized vegetable component (e. g., a polymerized vegetable oil, mixture of vegetable oils, or mixture of vegetable and mineral oils), two chaining agents (e. g., Marbon B and a mineral-oil product, a rubber product, or certain plastic materials), a sulphurizing component (e. g., sulphur), and a control component (e. g., litharge and a zinc product). It is a further object to provide a novel relatively-low-temperature polymerizing process for making rubber-like products.

Another object is to provide a process in which the hydrocarbon constituents of a suitably polymerized oil, either vegetable or mineral or a mixture of both, can be re-grouped chemically into a new material or product of a rubber-like consistency having a substantially higher molecular weight than the original components. Still another object of the invention involves the making of a novel product having unsaturated chained hydrocarbons which make it suitable for use as a commercial extender for rubber, reclaimed rubber, synthetic rubber, and plastic materials, the unsaturated hydrocarbons attaching themselves so as to produce compatible mixtures or new products.

Further objects and advantages of the invention will be evident to those skilled in the art from the following description of exemplary embodiments of the invention.

The method of the invention is preferably performed by employing at least three separate heat cycles and three polymerizing steps, though in some instances a two-step polymerization process can be employed. In the following exemplary description, three polymerizing steps will be described, applied successively to a vegetable component, a chaining component, and a sulphurizing component.

The polymerized vegetable component of the invention, as the term is herein-used, is a polymerized material comprising a polymerized vegetable-oil product or a polymerized mixture of vegetable and mineral oils. The preferred polymerized vegetable component is a suitably-polymerized mixture of linseed and cottonseed oil prepared by heating and cooling a mixture of these oils, the mixture containing from 5–95% linseed oil and 95-5% cottonseed oil, the preferred mixture usually containing a preponderance of linseed oil and preferably containing in the neighborhood of 70% linseed oil and 30% cottonseed oil (percentages and parts herein-referred to are by weight). The total amount of this polymerized vegetable component, based on the total constituents of the rubber-like product produced, can be varied over wide limits, the preferred amount being between about 25% and 40% of such total constituents.

The first heat cycle and polymerizing step involves heating the materials which are to form the polymerized vegetable component (e. g., a mixture of linseed oil and cottonseed oil) to a temperature of about 225° F. to 250° F. The mixture is heated relatively slowly and is stirred until a completely homogeneous mixture is obtained. It is then removed from the heat and allowed to cool. This cooling should be either in an air-tight container or in an air atmosphere of controlled humidity so that very little, if any, moisture is absorbed into the mixture from the air during the cooling. In the latter instance, the humidity should be relatively low, and preferably below 40% relative humidity.

During this cooling, a graining or growth takes place and polymerization occurs. If desired, the rate of cooling may be controlled to control the grain growth. The cooling is usually relatively slow and the mixture will usually be completely jelled after 24 hours. However, if the mixture is allowed to stand for several days a more complete growth is obtained.

The chaining component is next added to the jelled polymerized vegetable component, the total amount of the chaining component being about 20-65% of the rubber-like product produced. This chaining component comprises two chaining agents, herein referred to as a main chaining agent and an auxiliary chaining agent, each having the ability to re-group the chemical chains or to chain with the polymerized vegetable component.

The main chaining agent is a hydrocarbon of relatively high molecular weight, the preferred material in this class being "Marbon B," a cyclized rubber derived from treating #1 Pale Crepe rubber material with cresol and hydrogen chloride in a suitable reaction vessel. The addition of "Marbon B" or other main chaining agent at this stage to the polymerized vegetable component comprising the polymerized vegetable oil product or polymerized mixture of vegetable and mineral oils, causes the hydrocarbon constituents of the mixture to form hydrocarbon chains at comparatively low temperature, e. g., under 600° F., resulting in a rubber-like mass of higher molecular weight when subsequently cooled. The amount of "Marbon B" or other main chaining agent, based on the total constituents of the rubber-like product produced, will usually be about 5-15%.

"Marbon B" is the trade name used by Marbon Corporation of Gary, Indiana, to distinguish a pale, amber, transparent hydrocarbon which is tough, horny, fairly flexible, but has no sharp melting point, considerable mechanical pressure being necessary at 200° C. to produce a plastic flow. Marbon Corporation is the assignee of Patent No. 2,230,359, issued to J. P. McKenzie, covering the process used in making "Marbon B." The final product of the process does not dissolve in rubber, but at 100° C. it is sufficiently plastic to be readily milled with ordinary rubber processing machinery. It contains approximately 0.3% ash and 0.5% volatile material, the balance being pure hydrocarbon. "Marbon B" has the same empirical formula as rubber and is therefore a rubber isomer in the broad sense of the term. The Mitchell Patent No. 2,321,764 dated June 15, 1943, states that "Marbon B" is practically pure cyclized rubber containing no chlorine. "Marbon B" is said to have the following characteristics:

Refractive index _____ 1.54 approximately
Dielectric constant _____ 2.6–2.7
Power factor _____ 0.0005
Volume resistivity _____ $2.5 \times 10^{11}$ (ohms per cc.)
Dielectric strength _____ 620 v./m.
Dielectric endurance _____ 300 v./m. 28 days plus
Arcing test _____ No carbonization
Bulking value (average) __ 3.75 pounds per gallon
Water absorption ____ Less than 0.1% in 24 days The auxiliary chaining agent employed is a high-molecular-weight material that can be chained to the polymerized vegetable component when employing the main chaining agent, such as "Marbon B." This auxiliary chaining agent is preferably selected from one or more of three groups, to-wit, a mineral-oil product, a rubber-like material, and a plastic-material product, the selection being made on the basis of the class or properties of the rubber-like material to be produced. The total amount of the auxiliary chaining agent is preferably about 15-60% of the rubber-like product produced, and it is usually preferable that the amount of auxiliary chaining agent exceed the amount of main chaining agent, the preferred ratios being between about 1.5:1 and 6:1.

The mineral-oil product, forming one of the above groups from which the auxiliary chaining agent can be selected, is preferably a petroleum hydrocarbon having a molecular weight of at least 150 and capable of chaining with the polymerized vegetable component when employing a main chaining agent such as "Marbon B." A very satisfactory mineral-oil product, employed in most of the formulations exemplified herein, is asphalt, preferably having a melting point of about 250–350° F. Desirable grades of asphalt are sold under the trade name "Petrolastic Cement," by the Standard Oil Company of California. Alternatively, the mineral-oil product may be a specially salt-treated crude oil or may comprise prepared crude bottoms, tar, or equivalent products. The specially salt-treated crude oil may, for example, represent the residual products from the Houdry refining process (in which the crude oil or charging material is passed through a molten salt bath at high temperature), such residual products being prepared for use in the present invention by passing them through a porous bed of rock salt at much lower temperature than was employed in the molten salt bath. The prepared crude bottoms may represent the residue from cracking stills used in the refining of crude oils, these residues having a high unsaturated carbon content making them particularly desirable for processing with the polymerized vegetable component in accordance with the invention. Asphalt, or other of such mineral-oil products, can be advantageously employed as any of such products serve to modify the vegetable or mineral oil starting material and to impart toughness to the product and aid in the subsequent vulcanization thereof.

The rubber-like material, forming another of the above groups from which the auxiliary chaining agent can be selected, may be natural rubber, reclaimed rubber, or synthetic rubber (such as "Neoprene," "Hycar," Buna S, "Chemi-gum," "Thiokol," and "Norepol," etc.). It should be capable of suitable chaining to the polymerized vegetable component. "Neoprene" is the trade name for polymerized chloroprene, a polymerized reaction product of monovinylacetylene and HCl, made by E. I. du Pont de Nemours & Company, Wilmington, Delaware. Buna S is the copolymer of butadiene and styrene and was originally of German origin. "Thiokol" is olefine poly sulphide, a well known reaction product of ethylene chloride and certain polysulphides, made by Dow Chemical Company and marketed by the Thiokol Corporation, Trenton, New Jersey. "Norepol" is a relatively new rubber substitute made by Reichhold Chemicals, Inc., Detroit, Michigan, and others from soy bean oil and linseed oil and the subject of experimentation under the general direction of the Oil Protein Division, United States Department of Agriculture, Peoria, Illinois. It is compatible with "Thiokol" and certain mixtures of these two synthetics have properties superior to either synthetic alone. "Hycar" and "Chemi-gum" are two names for Buna N or "Perbunan," a butadiene polymer modified with acrylonitrile. "Norepol" is described in "Rubber Substitutes from Fatty Oils," by Nazarro & Abramowitz, Rubber Age, vol. 52, March, 1943. "Hycar" and "Chemigum" are identified in the Handbook of Plastics, by Simonds & Ellis, D. Van Nostrand Co., Inc., N. Y. city, published July, 1943. "Thiokol," "Neoprene" and "Buna S" are described not only in said Handbook of Plastics but also in Plastics in Engineering, by Delmonte, 2d ed., 1942, Penton Publishing Co., Cleveland, Ohio. All these products have a common chemical characteristic, namely, they are capable of aiding the polymerizations described herein, apparently because they have unsaturated hydrocarbons in their molecular structure.

The plastic-material product, forming still another of the above groups from which the auxiliary chaining agent can be selected, may comprise any of the plastic materials noted above, such as styrene, ethyl cellulose, vinylidene chloride, vinyl chloride, vinyl acetate, or other high-molecular-weight plastic materials which may be suitably chained chemically to the polymerized vegetable component, as described.

If the mineral-oil product, for example asphalt, is used without other auxiliary chaining agents, it is preferable to use from about 15–35% thereof, based on the total constituents of the rubber-like product produced. In general, this same percentage range applies also if the rubber-like material or the plastic-material product is employed alone as the auxiliary chaining agent. However, in some formulations, it is desirable that materials from more than one of the above three groups be used as the auxiliary chaining agent. For example, it is often desirable to employ simultaneously in this connection a mineral-oil product and a rubber-like material, as will be hereinafter exemplified, and in this instance the mineral-oil product (e. g., asphalt) may constitute about 15–35% of the total, while the rubber-like product (e. g., a synthetic rubber) may constitute about 10–30% of the total.

In adding the chaining component, it is usually desirable to re-heat the jelled polymerized vegetable component to a temperature of about 200–300° F. The main and auxiliary chaining agents may be added separately or together, the materials being stirred until thoroughly mixed with the polymerized vegetable component. Usually, however, we prefer to add the auxiliary chaining agent (e. g., asphalt) first, followed by mixing, and thereafter to add the main chaining agent, such as "Marbon B." During mixing, the temperature is then increased to about 400–500° F., as required. This is known as the second polymerizing step and, usually, extreme care must be taken in this step in properly controlling the heat and properly agitating the mixture until the reaction is complete. The agitation and heating are continued until the graining action stops and the liquid thins out into a very fluid mixture. The heating is then discontinued and the mixture is permitted to cool to about 140° F. If desired, a small amount of an accelerator, such as "Heptene," "Captax," or any other well-known accelerator, may be added with the main or auxiliary chaining agent for the purpose of controlling the rubber-like quality of the mass.

The third polymerizing step comprises the addition of the sulphurizing component. Sulphur is usually employed in this connection in proportions necessary to effect proper polymerization of the vegetable component. Preferably, the amount of sulphur used should be only enough to be completely used up in the chemical reaction of the materials and to obtain the proper hardness of the final product after vulcanization. Too high an amount of sulphur will result in the fibers of the resulting material being short and brittle and will result in increased hardness after vulcanization. The amount of sulphur will increase with percentage of cottonseed oil used. In general, the amount of sulphur required will be small, usually ranging from 3–15% of the total constituents.

It is also very desirable to add, usually along with the sulphurizing component, a control component usually comprising litharge (lead oxide) and a zinc product such as zinc oxide, powdered zinc (zinc dust), or a mixture of both. The control component may also include any suitable accelerator, such as "Heptene," "Captax" and diphenyl guanidine. However, we usually prefer to add the accelerator with the chaining component. Carbon black or other coloring, filling, or control agent may also be added as a part of the control component. The litharge acts as a drying agent for the mixture. The zinc oxide is employed as a carrier for the chemical activation of the accelerator. Zinc dust serves in the same capacity and also lowers the temperature at which the later-vulcanized product becomes brittle, this zinc dust imparting desirable qualities to the vulcanized material to keep it from cracking and crystallizing under cold temperatures.

The litharge and zinc-type materials are usually employed in relatively small amounts. The litharge is usually added in amount from about 3–10% of the total amount of materials, while the zinc product (zinc oxide or zinc dust, or both) will usually constitute from 1–15% of the total.

In the preferred practice of the invention, the sulphur, litharge, and zinc oxide and/or powdered zinc are added together to the partially cooled mixture, which is at a temperature of about 140° F. The resulting mixture is constantly agitated and the temperature gradually raised to 275° F. when complete sulphurization of the mixture will usually be effected. Heating is usually continued and may be carried to a temperature between 300° F. and 350° F. After 10–20 minutes at temperatures between 275° F. and 350° F., the mixture starts to string out. Care must be exercised to discontinue the heating when the stringing or polymerizing action is complete. Overheating of the mixture will produce an entirely different product which, upon cooling, will be hard and brittle. Proper discontinuance of the heating after the stringing action is complete will produce a mixture which, when cooled, is a homogenous, rubber-like mass comprising the preferred type of product of the invention. The cooling is preferably carried out in an air-conditioned atmosphere where the relative humidity is controlled at 40% or lower. The excessive absorption of moisture from the air during this cooling is detrimental to the aging of the finished product, to vulcanization of the finished product, and to the cold resistance of the finished product or the ultimate vulcanized product.

Numerous materials, proportions, and methods can be employed in compounding the products of the invention. As to those formulations employing asphalt and "Marbon B," the percentages of materials will usually be found to give well suited products in the following ranges: Polymerized vegetable component 25–40%, asphalt 15–35%, "Marbon B" 5–15%, sulphur 3–15%, litharge 3–10%, and zinc oxide or powdered zinc, or a mixture thereof, 1–15%. The following examples present typical formulations, though it should be understood that proportions, percentages, and materials given therein and elsewhere in this specification are exemplary rather than by way of undue limitation on the invention.

*Example I*

| Parts | Materials | Percent of total |
|---|---|---|
| 12 | Oil mixture (70% linseed and 30% cottonseed oil) | 28.3 |
| 9 | Asphalt (275° F. melting point) or Petrolastic Cement (XX grade), or equivalent | 21.2 |
| 3 | "Marbon B" | 7.1 |
| 1½ | "Heptene" | 3.5 |
| 4½ | Sulphur | 10.6 |
| 2½ | Litharge | 5.9 |
| 5 | Zinc oxide | 11.7 |
| 5 | Carbon black | 11.7 |
| | | 100.0 |

In the formulation, the linseed-cottonseed oil mixture is heated, while stirring, to 250° F. and allowed to cool at least 24 hours to form a jell, the cooling being conducted in a restricted-moisture atmosphere, as previously described. The asphalt, or equivalent material, is then added to the jell and the combined material is heated to approximately 300° F. and stirred, whereby the asphalt melts and is thoroughly mixed into the oils. The "Marbon B" and the "Heptene" are then added and the temperature is further raised to about 425° F., the agitation being continued until the graining stops and a thin liquid results. This liquid is allowed to cool to about 140° F., whereupon the sulphur, litharge, zinc oxide, and carbon black are added and thoroughly mixed together, the materials being stirred into the liquid and the temperature being gradually raised to about 275° F., or somewhat above. After agitation from 10–20 minutes at this temperature, the material starts to jell into long, fibrous, rubber-like stringers. When this reaction appears to be complete, the material is poured into a shallow pan and allowed to cool, preferably in the restricted-moisture atmosphere mentioned above.

The resulting material may be compounded in varying proportions, with natural rubber, reclaimed rubber, plastics, or synthetic rubbers, such as "Neoprene," "Hycar," "Chemi-gum," "Norepol" (or other synthetic rubbers made of soya bean oil), Buna S, etc. The resulting product may then be vulcanized in the usual way and the final product will have properties very close to, and in some instances surpassing, those of the material with which the product of the invention was compounded. In general, when the product of the invention is employed as an extender for natural, synthetic, or reclaimed rubber, one can expect a slight reduction in the tensile strength and in the elongation of the material. The resistance of the vulcanized product to cold temperatures may or may not increase. In many instances, the wear resistance and cohesion of the material will be materially increased, depending upon the ratio of the product of the invention and the material with which it is mixed. For example, the product as compounded in Example I may be mixed in varying proportions with reclaimed rubber up to equal parts by weight and compounded on rubber mills and made into what is termed by the rubber industry as "camel back" for use in retreading tires by standard vulcanization procedure without lowering the tensile strength or the elongation of the reclaimed rubber over about 10%. Use of the product of the invention as an extender of the base material with which it is mixed results in lessening the amount of this base material needed for the manufacture of a finished product and does not materially change its physical properties.

In Example I above, it is possible to substitute for the asphalt other members of the mineral-oil-product group, such as heavy crude bottoms. Alternatively, the mineral-oil product can be eliminated entirely and a rubber-like material employed exclusively as the auxiliary chaining component. For example, in place of the asphalt, we may use plastic materials or any of the above mentioned synthetic rubbers, or we may employ reclaimed or natural rubber. The proportions of such materials would be varied to obtain the desired physical properties of the polymerized product. Examples employing some of these materials are given hereinafter.

Also, in the formulation of Example I, a portion of the auxiliary chaining agent may be added at the time of adding the sulphur, litharge, and zinc product to obtain the desired physical properties of the polymerized product. In this connection, heavy crude bottoms, plastic materials, natural rubber, reclaimed rubber, or any of the above mentioned synthetic rubbers may be added with the sulphur, litharge, and zinc product.

*Example II*

| Parts | Materials | Per cent of total |
|---|---|---|
| 12 | Oil mixture (70% linseed, 30% cottonseed oil) | 32.0 |
| 9 | Asphalt (275° F. M. P.) | 24.0 |
| 4½ | "Marbon B" | 12.0 |
| 4½ | Sulphur | 12.0 |
| 2½ | Litharge | 6.7 |
| 5 | Zinc oxide | 13.3 |
| | | 100.0 |

The above ingredients may be combined in a manner similar to that previously described. The resulting product forms an excellent extender for compounding in about equal proportions with reclaimed rubber. Proper vulcanization will produce a very desirable bumper or cushion material for automotive vehicles. The resulting material also finds very distinct advantage when mixed with styrene, employing about 5–15% of the product, the resulting mixture, extruded into tubing at approximately 500–600° F., indicating some 25–75% or more increase in the dielectric strength of the tubing over that extruded without the addition of the extender, as well as lending increased flexibility. One of the chief uses of such a product is in the making of coaxial tubing conductors for use as radio antennae lead-in conductors to the instruments in the cabin or cockpit of an airplane.

A formulation in which a synthetic rubber is used as the sole auxiliary chaining agent, and which is compounded by steps similar to those above, is as follows:

*Example III*

| Parts | Materials | Percent of total |
|---|---|---|
| 12 | Oil mixture (70% linseed, 30% cottonseed oil) | 32.0 |
| 9 | Thiokol | 24.0 |
| 4½ | "Marbon B" | 12.0 |
| 4½ | Sulphur | 12.0 |
| 2½ | Litharge | 6.7 |
| 5 | Zinc oxide | 13.3 |
| | | 100.0 |

Another formulation, polymerized substantially as described above except that the material was heated to about 425° F. before adding the sulphur, litharge, and zinc oxide (the temperature being maintained until polymerization was complete), is as follows:

*Example IV*

| Parts | Materials | Percent of total |
|---|---|---|
| 12 | Oil mixture (70% linseed, 30% cottonseed oil) | 36.9 |
| 9 | Asphalt (275° F. M. P.) | 27.7 |
| 4 | "Marbon B" | 12.3 |
| 2½ | Sulphur | 7.7 |
| 2½ | Litharge | 7.7 |
| 2½ | Zinc oxide | 7.7 |
| | | 100.0 |

The above material combined in the ratio of 25%:75% with reclaimed rubber and vulcanized for 65 minutes at 290° F. indicated a tensile strength of 1200 p. s. i. and an elongation of 280%. Similar materials were compounded and made into camel back for retreading test tires, proportions being as follows:

| | Per cent |
|---|---|
| Whole tire reclaim rubber | 57.8 |
| Product of Example IV | 19.2 |
| Soft channel carbon black | 18.5 |
| Zinc oxide | 1.5 |
| BLE | 0.5 |
| Stearic acid | 1.2 |
| Santocure | 0.3 |
| Sulphur | 1.0 |
| | 100.0 |

The hardness of the resulting tire tread was 78 after vulcanization.

The above material of Example IV, when compounded with reclaimed rubber in equal amount and vulcanized for 80 minutes at 290° F., indicated a tensile strength of 1100 p. s. i. and an elongation of 250%. Test tires were made with the following percentages:

| | Per cent |
|---|---|
| Whole tire reclaim rubber | 38.5 |
| Product of Example IV | 38.5 |
| Soft channel carbon black | 19.2 |
| Zinc oxide | 1.5 |
| BLE | 0.5 |
| Stearic acid | 1.2 |
| Santocure | 0.6 |
| | 100.0 |

The hardness of the resulting tire tread was observed to be 80 after vulcanization. The cold qualities were somewhat poorer than those of the tires previously mentioned, though this can be accounted for, at least in part, by the fact that the cure time was somewhat too long on the latter tire and no sulphur was employed in the compounding step.

A polymerized product employing two auxiliary chaining agents and which is quite soft and tacky can be made using the following materials:

*Example V*

| Parts | Materials | Per cent of total |
|---|---|---|
| 12 | Oil mixture (70% linseed, 30% cottonseed oil) | 32.0 |
| 9 | Asphalt (275° F. M. P.) | 24.0 |
| 5 | "Norepol" | 13.3 |
| 4 | "Marbon B" | 10.6 |
| 2½ | Sulphur | 6.7 |
| 2½ | Litharge | 6.7 |
| 2½ | Zinc oxide | 6.7 |
| | | 100.0 |

In formulating this embodiment of the invention, the "Norepol" can be added at the same time that the asphalt is added.

A very tough rubber-like product employing two auxiliary chaining agents may be formulated as follows:

*Example VI*

| Parts | Materials | Per cent of total |
|---|---|---|
| 12 | Oil mixture (70% linseed, 30% cottonseed oil) | 30.2 |
| 9 | Asphalt (275° F. M. P.) | 22.6 |
| 7 | "Norepol" | 17.6 |
| 4 | "Marbon B" | 10.1 |
| ¾ | Diphenyl guanidine | 1.9 |
| 3 | Sulphur | 7.5 |
| 2½ | Litharge | 6.3 |
| 1½ | Zinc oxide | 3.8 |
| | | 100.0 |

The "Norepol" can be added at the same time and together with the asphalt. This formulation has been satisfactorily compounded at relatively high temperatures, the sulphur, lead oxide, and zinc oxide being added when the mixture was about 325° F. and the final polymerization taking place between 325° F. and 350° F. The hardness of the resulting product was approximately 10 using a Shore durometer.

Another formulation employing two auxiliary chaining agents and which produces a very soft and tacky material, if final polymerization is between about 325° F. to 350° F., is as follows:

Example VII

| Parts | Materials | Percent of total |
|---|---|---|
| 12 | Oil mixture (70% linseed, 30% cottonseed oil) | 28.6 |
| 9 | Asphalt (275° F. M. P.) | 21.4 |
| 11½ | "Norepol" | 27.4 |
| 4 | "Marbon B" | 9.5 |
| 2 | Sulphur | 4.8 |
| 2½ | Litharge | 5.9 |
| 1 | Zinc oxide | 2.4 |
|  |  | 100.0 |

A formulation having somewhat better cold qualities than those previously mentioned is as follows:

Example VIII

| Parts | Materials | Percent of total |
|---|---|---|
| 4 | Linseed oil | 11.6 |
| 8 | Cottonseed oil | 23.2 |
| 9 | Asphalt (275° F. M. P.) | 26.1 |
| 5 | "Marbon B" | 14.5 |
| 1 | Diphenyl guanidine | 2.9 |
| 4½ | Sulphur | 13.0 |
| 1½ | Litharge | 4.3 |
| 1½ | Zinc oxide | 4.4 |
|  |  | 100.0 |

A somewhat superior product for the making of camel back material for tire retreading purposes is as follows:

Example IX

| Parts | Materials | Percent of total |
|---|---|---|
| 6 | Cottonseed oil | 15.9 |
| 8 | Linseed oil | 21.2 |
| 9 | Asphalt (275° F. M. P.) | 23.8 |
| 4 | "Marbon B" | 10.6 |
| ¼ | Diphenyl guanidine | .7 |
| 4 | Sulphur | 10.6 |
| 2½ | Litharge | 6.6 |
| 1½ | Zinc oxide | 4.0 |
| 2½ | Zinc dust (powdered metallic zinc—500 mesh) | 6.6 |
|  |  | 100.0 |

A typical composition employing 40% of this material is given as follows, though it should be understood that higher or lower ratios may be employed:

|  | Percent |
|---|---|
| Whole tire reclaim rubber | 45.9 |
| Material from Example IX | 30.6 |
| Soft channel carbon black | 18.5 |
| Zinc oxide | 1.5 |
| BLE | 0.5 |
| Stearic acid | 1.2 |
| Santocure | 0.3 |
| Sulphur | 1.5 |

This material can be satisfactorily vulcanized at 280° F. or slightly lower temperature for 60-65 minutes.

In general, accelerators may be used in all formulations of the invention, if desired. Examples are given above. Such accelerators have the function of controlling to some extent the rubber-like character of the product. However, such accelerators are not absolutely necessary in addition to "Marbon B" and may impart poor cold qualities to the product.

Various changes can be made in the proportions and methods of compounding the materials without departing from the spirit of the invention as defined in the appended claims.

We claim as our invention:

1. A process comprising the following steps: mixing linseed and cottonseed oils with at least 5% by weight of either oil being present; heating the mixture of oils to approximately 225°–250° F. and agitating so that a completely homogeneous mixture is obtained; causing the mixture to cool very slowly under conditions of low humidity, so that polymerization occurs; reheating to about 200–300° F.; adding a small percentage of a cyclized rubber as a main chaining agent; adding a large percentage of an auxiliary chaining agent, the ratio of the weight of the auxiliary chaining agent to that of the main chaining agent varying between 1.5:1 and 6:1; the auxiliary chaining agent being taken from the group consisting of asphalt having a melting point of between 250°–350° F., prepared crude bottoms, tar, the residual products from the Houdry oil refining process treated by passing them through a heated porous bed of rock salt, natural rubber, reclaimed rubber, synthetic rubber, styrene, ethyl cellulose, vinylidene chloride, vinyl chloride, vinyl acetate, and the co-polymer of vinyl chloride-acetate; increasing the temperature, during mixing of the chaining agents, to about 400°–500° F. and agitating, to bring about a second polymerization with a resultant thinning of the mixture; permitting the mixture cool to about 140° F.; adding a small percentage, not over 15%, of sulphur; agitating and slowly raising the temperature of the mixture to 300°–350° F.; discontinuing the heating when the mixture strings out or polymerizes; and gradually cooling in an atmosphere of controlled low humidity.

2. The invention according to claim 1, wherein the vegetable oils comprise 25–40% of the total; the mineral oil product comprising 15–35%; the main chaining agent comprising 5–15%; and the sulphur comprising 3–15%; all percentages being by weight.

3. The invention according to claim 1, characterized by adding, in the final mixing step, a control component selected from the group comprising litharge, carbon black, zinc oxide, powdered metallic zinc, and a mixture of zinc oxide and powdered metallic zinc; the control component comprising from 5 to 30% of the total mixture; all percentages being by weight.

4. A process comprising the following steps: mixing linseed and cottonseed oils in the proportions not less than 5% of either oil and 95% of the other oil; heating the mixture of oils to approximately 250° F. while stirring, and allowing to cool at least 24 hours, in an atmosphere of low moisture content, to form a jell; adding asphalt having a melting point of about 275° F. and heating to approximately 300° F. and stirring; adding a small percentage of a cyclized rubber and raising the temperature to about 425° F. with concomitant agitation; the agitation being continued until the graining stops and a thin liquid results; allowing the liquid to cool to about 140° F.; stirring in a control component selected from the group consisting of sulphur, litharge, zinc oxide, and carbon black, the total of said stirred-in ingredients not exceeding 40% by weight of the total mixture; gradually raising the temperature of the mixture to a temperature exceeding 275° F. but less than 350° F., with concomitant agitation; and allowing the mixture to cool under low humidity conditions.

5. The invention according to claim 4, wherein the mixture of oils is 28.3% of the total and comprises 70% linseed oil and 30% cottonseed oil; the asphalt is 21.2%; the cyclized rubber is 7.1%; the sulphur is 10.6%; the litharge is 5.9%; the zinc oxide and the carbon black are each 11.7% of the total; and in addition, 3.5% of an accelerator is added with the "Marbon B"; all percentages being by weight and being approximate.

6. The invention according to claim 4, wherein the oil mixture is 32% of the total and comprises 70% linseed oil and 30% cottonseed oil; the asphalt is 24%; the cyclized rubber is 12%; the sulphur is 12%; the litharge is 6.7%; and the zinc oxide is 13.3%; all percentages being by weight and being approximate.

7. The invention according to claim 4, wherein the oil mixture is 36.9% of the total and comprises 70% linseed oil and 30% cottonseed oil; the asphalt is 27.7%; the cyclized rubber is 12.3%; the sulphur, litharge and zinc oxide are each 7.7%; all percentages being by weight and being approximate.

8. The invention according to claim 4, wherein the oil mixture consists of 70% linseed oil and 30% cottonseed oil and is 32% of the total; the asphalt is 24%; the cyclized rubber is 10.6%; the sulphur, litharge, and zinc oxide are each 6.7%; and in addition, 13.3% of a rubber substitute from fatty oils is added with the asphalt; all percentages being by weight and being approximate.

9. The invention according to claim 4, wherein the oil mixture consists of 70% linseed oil and 30% cottonseed oil and is 30.2% of the total; the asphalt is 22.6%; the cyclized rubber is 10.1%; the sulphur is 7.5%; litharge is 6.3%; zinc oxide is 3.8%; and in addition, a rubber substitute from fatty oils is added with the asphalt to an amount 17.6% of the total; diphenyl guanidine to the extent of 1.9% being added as an accelerator; all percentages being by weight and being approximate.

10. The invention according to claim 4, wherein the oil mixture consists of 70% linseed oil and 30% cottonseed oil and is 28.6% of the total; the asphalt is 21.4%; the cyclized rubber is 9.5%; the sulphur is 4.8%; the litharge is 5.9%; the zinc oxide is 2.4%; and in addition, 27.4% of a rubber substitute from fatty oils is added with the asphalt, final polymerization being between 325° F. and 350° F.; all percentages being by weight and being approximate.

11. The invention according to claim 4, wherein the oil mixture comprises one part of linseed oil and two parts of cottonseed oil, together forming a mixture which is 34.8% of the total; the asphalt being 26.1%; the cyclized rubber being 14.5%; the sulphur being 13%; the litharge being 4.3%; the zinc oxide being 4.4%; and in addition, diphenyl guanidine in the amount of 2.9% is added as an accelerator; all percentages being by weight and being approximate.

12. The invention according to claim 4, wherein the oil mixture comprises three parts of cottonseed oil and four parts of linseed oil, the oil mixture comprising 37.1% of the total; the asphalt comprising 23.8%; the cyclized rubber comprising 10.6%; the sulphur comprising 10.6%; the litharge comprising 6.6%; zinc oxide comprising 4%; powdered metallic zinc of a fineness of 500 mesh comprising 6.6%; and in addition, diphenyl guanidine in the amount of 0.7% is added as an accelerator; all percentages being by weight and being approximate.

13. A mixture for extruded tubing of high dielectric strength comprising styrene mixed with the following polymerized product: an oil mixture consisting of 70% linseed oil and 30% cottonseed oil, asphalt, cyclized rubber, sulphur, litharge, and zinc oxide, in the following proportions by weight: 32% oil mixture, 24% asphalt, 12% cyclized rubber, 12% sulphur, 6.7% litharge and 13.3% zinc oxide; said polymerized product being mixed with the styrene in the proportions of 5-15% of the product and 95-85% of the styrene; all percentages being by weight and being approximate.

14. A vulcanizable product for manufacturing automotive tires and the like comprising about 50% reclaimed rubber and about 50% of a rubber extruder consisting of the polymerized product of the following ingredients: 32% of an oil mixture comprising linseed oil 70% and cottonseed oil 30%; 24% of asphalt having a melting point of about 275° F.; 12% of cyclized rubber, 12% of sulphur; 6.7% of litharge; and 13.3% of zinc oxide; all percentages being by weight and being approximate.

15. A vulcanizable product for manufacturing automotive tires and the like comprising about 75% reclaimed rubber and 25% of a rubber extender consisting of the polymerized product of the following ingredients: an oil mixture consisting of 70% linseed oil and 30% cottonseed oil and making 36.9% of the total; 27.7% of asphalt having a melting point of about 275° F.; 12.3% of cyclized rubber; 7.7% of each of sulphur, litharge and zinc oxide; all percentages being by weight and being approximate.

16. A vulcanizable product for manufacturing automotive tires and the like comprising the following: 38.5% of whole tire reclaim rubber; 19.2% soft channel carbon black; 1.5% zinc oxide; 1.2% stearic acid; and 38.5% of the polymerized product of the following ingredients: an oil mixture of 70% linseed oil and 30% cottonseed oil, making up 36.9% of the polymerized product; 27.7% asphalt of a melting point of about 275° F.; 12.3% cyclized rubber; 7.7% sulphur; 7.7% litharge; and 7.7% zinc oxide; the above percentages being by weight and being approximate.

17. A composition for retreading automotive tires comprising the following: 57.8% whole tire reclaim rubber; 18.5% soft channel carbon black; 1.5% zinc oxide; 1.2% stearic acid; 1% sulphur; and 19.2% of the polymerized product of the following ingredients: an oil mixture of 70% linseed oil and 30% cottonseed oil, making up 36.9% of the polymerized product; 27.7% asphalt of a melting point of about 275° F.; 12.3% cyclized rubber; 7.7% sulphur; 7.7% litharge; and 7.7% zinc oxide; the above percentages being by weight and being approximate.

18. A composition for retreading automotive tires comprising the following: 45.9% whole tire reclaim rubber; 18.5% soft channel carbon black; 1.5% zinc oxide; 12% stearic acid; 1.5% sulphur; and 30.6% of the polymerized product of the following ingredients: three parts of cottonseed oil and four parts of linseed oil, totaling 37.1% of the polymerized product; 23.8% asphalt of a melting point of about 275° F.; 10.6% cyclized rubber; 0.7% diphenyl guanidine; 10.6% sulphur; 6.6% litharge; 4.0% zinc oxide; and 6.6% powdered metallic zinc; the above percentages being by weight and being approximate.

DONALD SANDERSON.
HARRY E. PFAFF.
MURRAY E. GARRISON.